(12) United States Patent
Dunagan et al.

(10) Patent No.: US 8,055,649 B2
(45) Date of Patent: Nov. 8, 2011

(54) SCALED MANAGEMENT SYSTEM

(75) Inventors: John D Dunagan, Bellevue, WA (US);
Heather E Warncke, Seattle, WA (US);
Albert Greenberg, Seattle, WA (US);
Alastair Wolman, Seattle, WA (US);
Emre M Kiciman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 12/043,487

(22) Filed: Mar. 6, 2008

(65) Prior Publication Data
US 2009/0228431 A1    Sep. 10, 2009

(51) Int. Cl.
*G06F 17/30* (2006.01)

(52) U.S. Cl. ........ 707/713; 707/707; 707/709; 707/711; 707/712; 707/722; 707/736; 707/758; 707/781; 713/310; 713/340; 709/224; 702/186; 718/100

(58) Field of Classification Search .................. 707/707, 707/709, 711, 712, 713, 722, 736, 758, 781, 707/999.003, 999.004, 999.005; 713/310, 713/340; 709/224; 702/186; 718/100
See application file for complete search history.

(56) References Cited

U.S. PATENT DOCUMENTS

| | | | | |
|---|---|---|---|---|
| 2002/0061743 | A1* | 5/2002 | Hutcheson et al. | 455/426 |
| 2006/0259621 | A1* | 11/2006 | Ranganathan et al. | 709/226 |
| 2007/0150600 | A1* | 6/2007 | Barsness et al. | 709/227 |
| 2009/0106571 | A1* | 4/2009 | Low et al. | 713/310 |

* cited by examiner

*Primary Examiner* — Syling Yen
(74) *Attorney, Agent, or Firm* — Lee & Hayes, PLLC

(57) ABSTRACT

An exemplary system for managing an applications and data space includes a strategy layer configured to receive a query statement and to formulate one or more custom queries based on the query statement and a query scheduler layer configured to schedule issuance of the one or more custom queries to one or more query response modules associated with the applications and data space. Other methods, devices and systems are also disclosed.

3 Claims, 12 Drawing Sheets

SCALED MANAGEMENT SYSTEM

BACKGROUND

Software as a service (SaaS) includes Web-based e-mail services (e.g., the MICROSOFT® HOTMAIL® e-mail service) where a vendor typically hosts all of the program logic and data and provides end users with access to this data over the public Internet through a Web-based user interface. Such a service relies on distributed applications and a large amount of data, which may be stored in more than one data center. Other examples of SaaS include line-of-business services, which are often large, customizable business solutions aimed at facilitating business processes such as finances, supply-chain management, and customer relations and consumer-oriented services. Regarding consumer-oriented services, these services are sometimes supported by advertising and offered to the general public at no cost.

Distributed applications can be data intensive and complex. For example, consider a financial services organization that actively monitors (i) financial markets, (ii) individual trader activity and (iii) customer accounts. An application running on a trader's desktop may track a moving average of the value of an investment portfolio. This moving average needs to be updated continuously as stock updates arrive and trades are confirmed, but does not require perfect accuracy. A second application running on the trading floor extracts events from live news feeds and correlates these events with market indicators to infer market sentiment, impacting automated stock trading programs. This query looks for patterns of events, correlated across time and data values, where each event has a short "shelf life". In order to be actionable, the query must identify a trading opportunity as soon as possible with the information available at that time; late events may result in a retraction. Yet another application, a third application, running in a compliance office monitors trader activity and customer accounts, to watch for churn and ensure conformity with Security and Exchange Commission rules and institution guidelines. These queries may run until the end of a trading session, perhaps longer, and must process all events in proper order to make an accurate assessment. These three applications carry out similar computations but differ significantly in their workload and requirements for consistency guarantees and response time.

Various issues exist in the realm of distributed applications such as multi-tenant customization and extensibility, data scaling and isolation issues.

SUMMARY

An exemplary system for managing an applications and data space includes a strategy layer configured to receive a query statement and to formulate one or more custom queries based on the query statement and a query scheduler layer configured to schedule issuance of the one or more custom queries to one or more query response modules associated with the applications and data space. Other methods, devices and systems are also disclosed.

DESCRIPTION OF DRAWINGS

Non-limiting and non-exhaustive examples are described with reference to the following figures.

DETAILED DESCRIPTION

Figure 1:
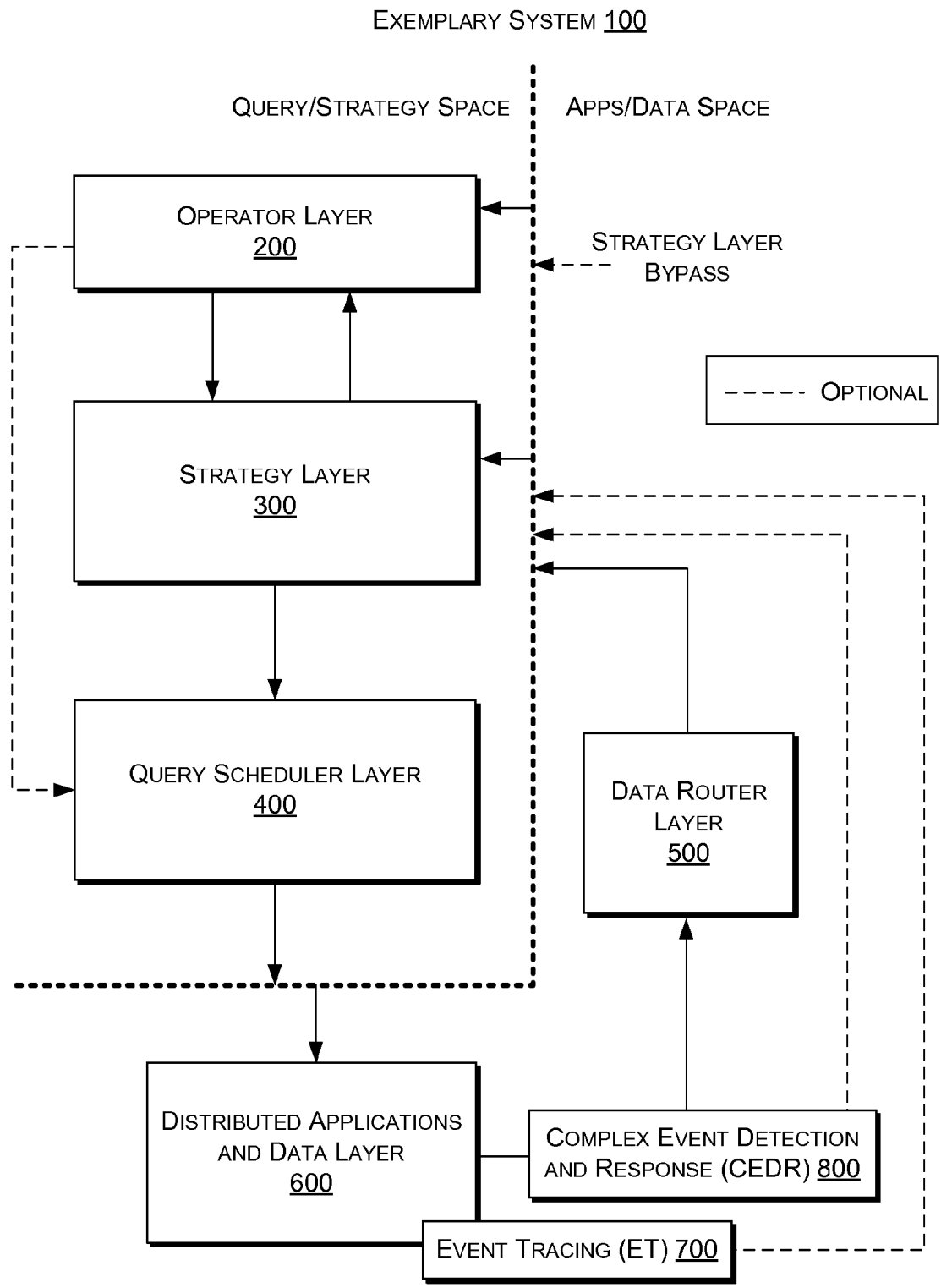
FIG. 1 is a diagram of an exemplary system that includes a query and strategy space and an applications and data space.

Various exemplary methods, devices and system described herein pertain to management of resources for distributed applications. An exemplary management system is configured to receive basic operator queries, to formulate strategic queries, to schedule queries and to distribute queries in an applications and data space. The system can optionally formulate strategic queries and schedule queries based in part on information responsive to one or more prior queries. Such a system can be used to manage resources in one or more server farms that provide software as a service (SaaS). Management of resources can include management for purposes of efficiency, maintenance, cost, debugging, etc.

An exemplary system includes one or more event tracing modules and one or more event detection and response modules in an applications and data space. Information from the latter may be routed by an exemplary router to a query and strategy space. In turn, components of the query and strategy space can decide whether to provide information to one or more operators or to formulate one or more additional queries.

An exemplary query module receives query statements written in a language parsable by a language engine and formulates custom or strategic queries. An exemplary query scheduler component of the query module schedules and distributes queries to one or more modules in an applications and data space. For example, an applications and data space can include servers organized into server blocks where each server in a particular server block includes an operating system level event tracing module and where data transmitted by one or more of the servers optionally passes through an event detection and response module. In such an applications and data space, the query scheduler component can schedule and direct queries to one or more event tracing modules and/or to one or more event detection and response modules.

An exemplary strategy module includes one or more strategy algorithms and information about an applications and data space. The information can include one or more of an event tracing module map, a event detection and response map, application information, a knowledge base, hardware information, bandwidth information, information about standard queries (e.g., types, schedules, etc.), current condition information and trend information (e.g., operating trends, usage trends, query trends, etc.).

A system optionally includes one or more intelligent data routers. An exemplary intelligent data router includes maps for routing data and, in particular, data responsive to one or more queries. Such maps can include one or more of an operator map, a query map, a strategy map and an event detection and response module map. An intelligent data router can also include bandwidth information and hardware information for resources in a server block or in a server facility (e.g., a server farm).

An exemplary method includes receiving a query about increased workload, receiving information about workload, formulating one or more custom queries based in part on the query and the information about workload, receiving information responsive to one or more queries (e.g., custom and/or standard) and deciding whether the information is sufficient to respond to the query about increased workload. In such a method, information responsive to a query is optionally issued by one or more event tracing modules and/or one or more event detection and response modules. In such a method, information responsive to a query is optionally routed by an intelligent data router.

An exemplary method includes receiving a query about latency, receiving information about latency, formulating one or more custom queries based in part on the query and the information about latency, receiving information responsive to one or more queries (e.g., custom and/or standard) and deciding whether the information is sufficient to respond to the query about increased latency. In such a method, information responsive to a query is optionally issued by one or more event tracing modules and/or one or more event detection and response modules. In such a method, information responsive to a query is optionally routed by an intelligent data router.

FIG. 1 shows an exemplary system 100 that includes components in a query/strategy space and components in an applications/data space. The components in the query/strategy space include an operator layer 200, a strategy layer 300 and a query scheduler layer 400. The components in the applications/data space include a data router layer 500, a distributed applications and data layer 600, an event tracing (ET) layer 700 and a complex event detection and response (CEDR) layer 800. Communication occurs between the query/strategy space and the applications/data space. For example, an operator in the operator layer 200 may need to know information about resources in the applications/data space. In this example, the strategy layer 300 and the query scheduler layer 400 can determine how to acquire information sufficient to satisfy the operator's need to know information about resources in the applications/data space.

With respect to what an operator in the operator layer 200 may want to know, consider that as databases serve more users concurrently and grow in size, the amount of time it takes to perform operations for distributed applications (such as Web querying and searching) increases significantly. SaaS applications, which often use the same databases to serve thousands of customers, are particularly susceptible to these types of performance degradation. Consequently, an operator may want to know where performance degradation is occurring or where resources are available to perform additional work.

An administrator of resources in an applications and data space may need to know how to scale resources or otherwise manage resources to alleviate performance bottlenecks. One fairly simple way to scale a database is through partitioning, which divides data into smaller "chunks" to improve efficiency. Consider a partitioning strategy that aims to determine the best way to partition data. For example, if an application has customers from around the world, a geographic partitioning strategy might be appropriate, with data belonging to European customers in one partition, data belonging to Asian customers in another, and so on. Dynamic repartitioning strategies can help ensure that already-partitioned data can be repartitioned in order to keep up with performance and scale metrics.

With respect to operational structure of an application, an operator may be concerned with what it takes to deliver the application to customers and to keep the application available and running well at a cost-effective level. For many operators, which have never had to run a data center for their customers, this may be the most unfamiliar aspect of SaaS.

Accordingly, a variety of people often need to know information about how resources perform. As described herein, an exemplary management system can help SaaS providers and others in operating and managing SaaS applications. Such a management system can also help administrators scale and allocate resources. To help such people meet their goals, an exemplary query system provides a mechanism to accept a question and to provide an intelligent response to the question.

Figure 2:
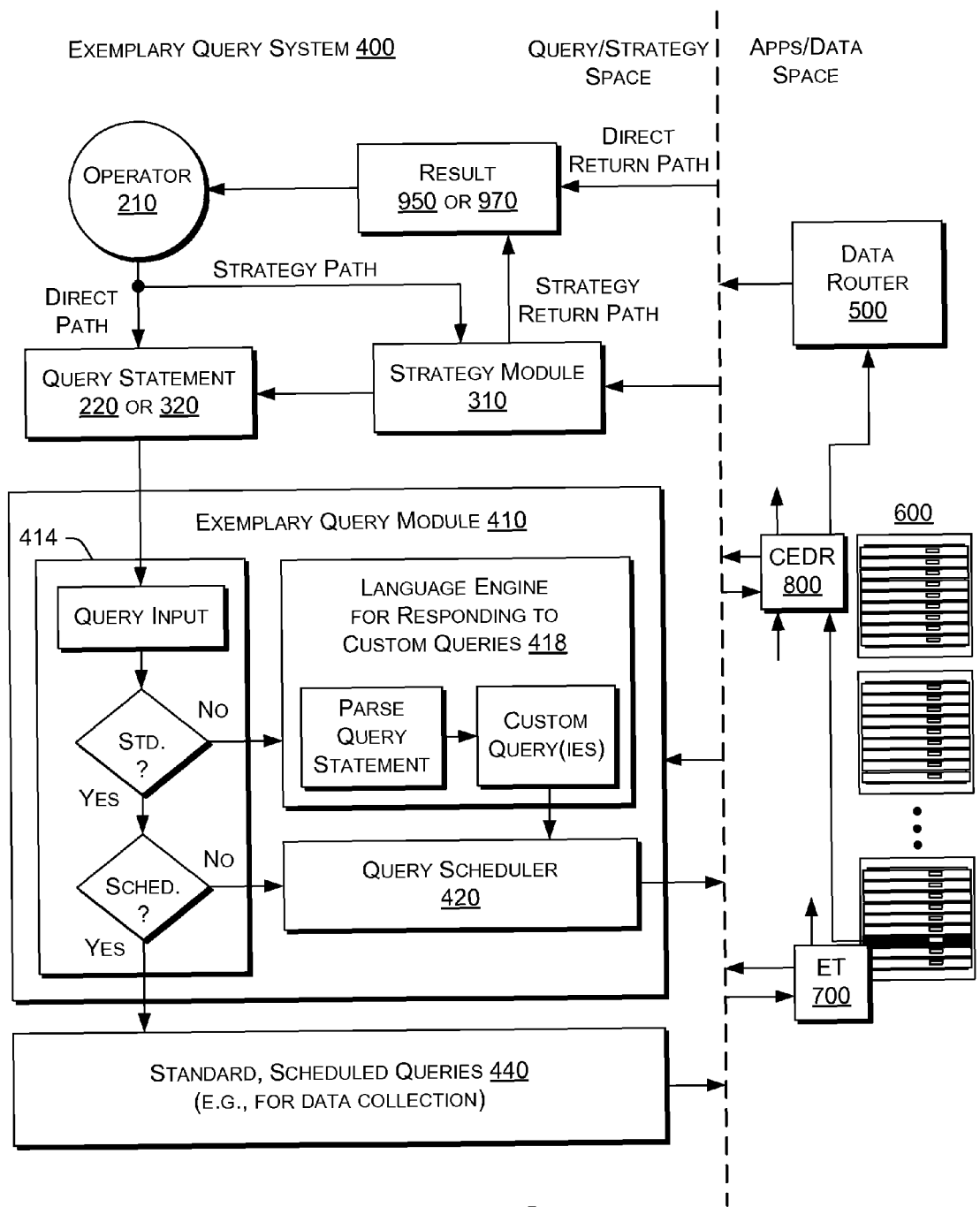
FIG. 2 is a diagram of an exemplary query system for issuing queries to acquire information about an applications and data space.

FIG. 2 shows an exemplary query system 400 configured to receive queries and to provide responses to queries. The system 400 may act in an iterative manner, for example, with feedback, or in a single pass manner. In a single pass execution, an operator 210 forms a query statement 220 that is directed to a query input block 414 of a query module 410. The query input block 414 decides whether the query statement 220 pertains to a standard query or a non-standard query.

If the block 414 decides that the query statement 220 is for a standard, scheduled query, then a standard, scheduled query block 440 is notified. As described herein, some set of standard, scheduled queries exist that are directed to various components in an applications and data space. Responses to such queries are returned as standard results per result block 950 and can be provided to the operator 210. However, at times, an operator may need to know information that is not provided in response to a standard query; hence, the need for providing a mechanism for non-standard queries.

If the query statement 220 pertains to a non-standard query, then a language engine 418 parses the query statement 220 to form one or more custom queries. The one or more custom queries are then scheduled by a query scheduler 420, which may also schedule unscheduled standard queries.

With respect to the language engine 418, the query statement 220 is written in a language that allows the operator 210 to express desired information. For example, a natural language can allow the operator 210 to ask: "For my application X, why is the latency so high". The engine 418 can parse the statement to identify "application X", "latency" and "high". Given these three pieces of query information, the language engine can formulate one or more custom queries using appropriate control logic. For example, consider the following:

Exemplary Control Logic:

Identify all servers executing application X and their corresponding event tracing modules;

Identify all CEDR modules flowing data from these servers;

Group all event tracing modules for servers for application X and corresponding CEDR modules;

For each group, formulate custom queries to query event tracing modules followed by their CEDR modules; and Schedule queries according to group where in each group first query event tracing modules and then corresponding CEDR module(s).

In response to issuance of these queries, information is provided to the operator 210 via a direct return path as a result 950 or via a strategy module 310 as a result 970. In this example, the strategy module 310 may analyze information responsive to the custom queries and decide if one or more additional queries are required to provide information sufficient to answer the query of the operator 210. For example, an analysis may indicate that a certain block of servers executing application X are responsible for the latency. However, the reason cannot be stated without additional information from these servers. So, the strategy module 310 formulates a query statement 320 to retrieve additional information to identify, as specifically as possible, the source of the high latency.

Figure 3:
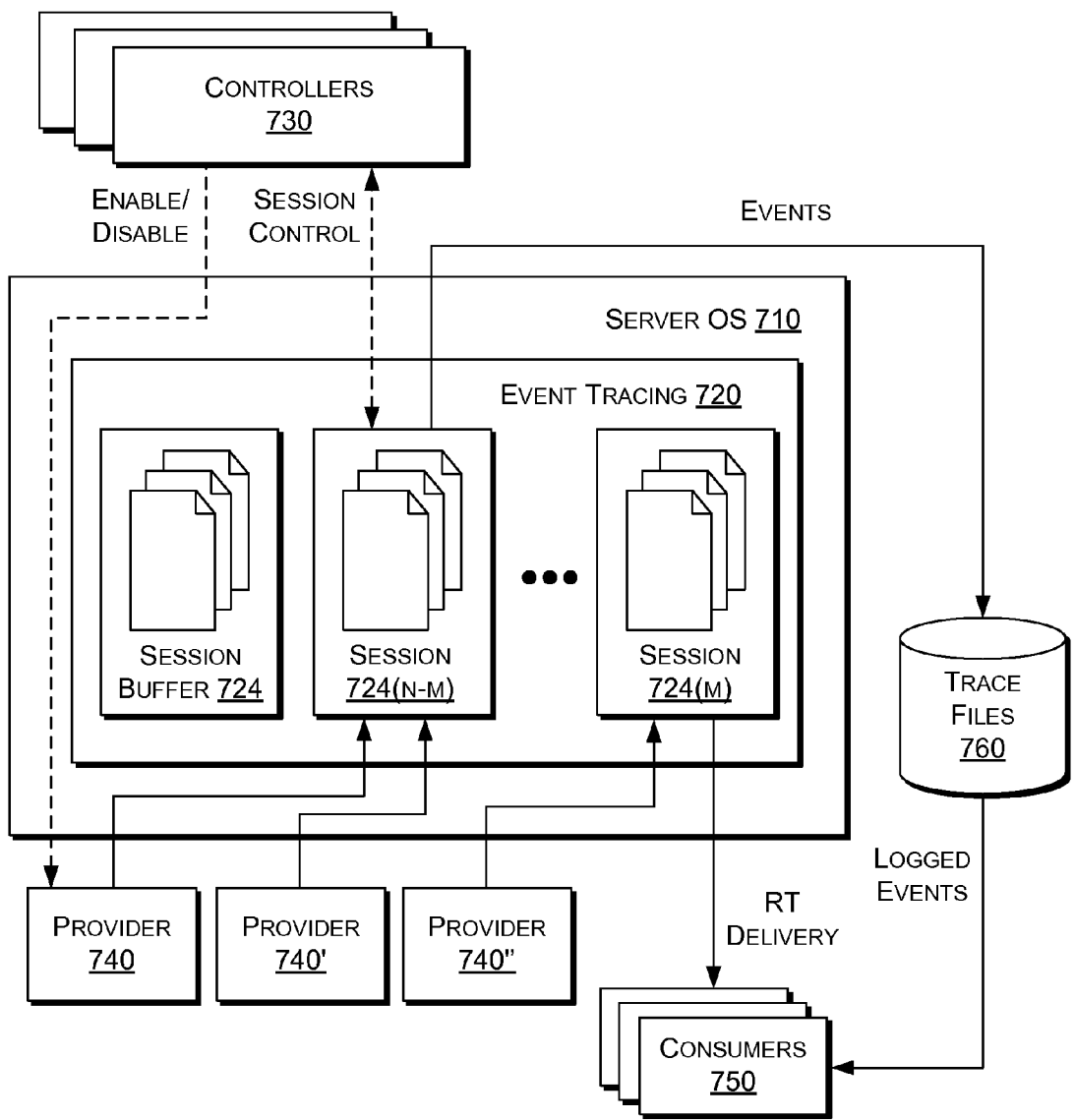
FIG. 3 is a diagram of an exemplary event tracing module.

An exemplary system includes event tracing at the operating system level. FIG. 3 shows an event tracing architecture 700 for an operating system 710. As shown in FIG. 3, the architecture 700 includes an event tracing module 720 that functions in conjunction with the operating system 710. The architecture 700 includes four main types of components: controllers 730, event providers 740, consumers 750, and event trace sessions 724. Buffering and logging take place in event tracing sessions 724, which accept events and create a trace file 796. A number of logging modes typically exist for ET sessions. For instance, a session can be configured to deliver events directly to consumer applications 750 or to overwrite old events in a file 760 by wrapping around when a certain size is reached. A separate writer thread created for each session can flush them to a file 760 or to real-time consumer applications 750. To enable high-performance, per-processor buffers can be used to eliminate the need for a lock in the logging path.

An event provider 740 is a logical entity that writes events to ET sessions 724. Any recordable activity of significance can be an event, and each is represented by an event logged to ET. An event provider 740 can be a user-mode application, a managed application, a driver, or any other software entity. In general, an event provider 740 must register a provider ID with ET 720 through a registration API. A provider 740 first registers with ET 720 and writes events from various points in the code by invoking an ET logging API. When a provider is enabled dynamically by the ET controller application 730, calls to the logging API can send events to a specific trace session 724 designated by the controller 730. Each event sent by the event provider 740 to a trace session 724 can include a fixed header that includes, for example, event metadata and additional variable user-context data. Due to growing use of event instrumentation in many OS components, even a simple application may already contain several components that are event providers 740.

When an event is logged to a session, ET 720 can add a few extra data items along with, for example, user-provided data. Such items can include timestamp, process and thread ID, processor number, and CPU usage data of the logging thread. These data items can be recorded in an ET event header and passed on to event consumers 750 optionally along with the variable event content given by a provider 740. Many trace consumers 750 find these data fields to be helpful in performance analyses.

A controller 730 can start and stop ET sessions 724 and enable provider 740 access to ET sessions 724. In some scenarios, such as debugging and diagnosis, a controller tool may be invoked, as needed, to collect in-depth traces. In contrast, for events such as admin-targeted events that need to flow to an event viewer at all times, providers 740 may be enabled automatically by an event log service when the providers 740 register. In general, a controller 730 must have ET permission on the operating system 710 to control sessions, which is typically given only to a small group of privileged users by default.

Figure 7:
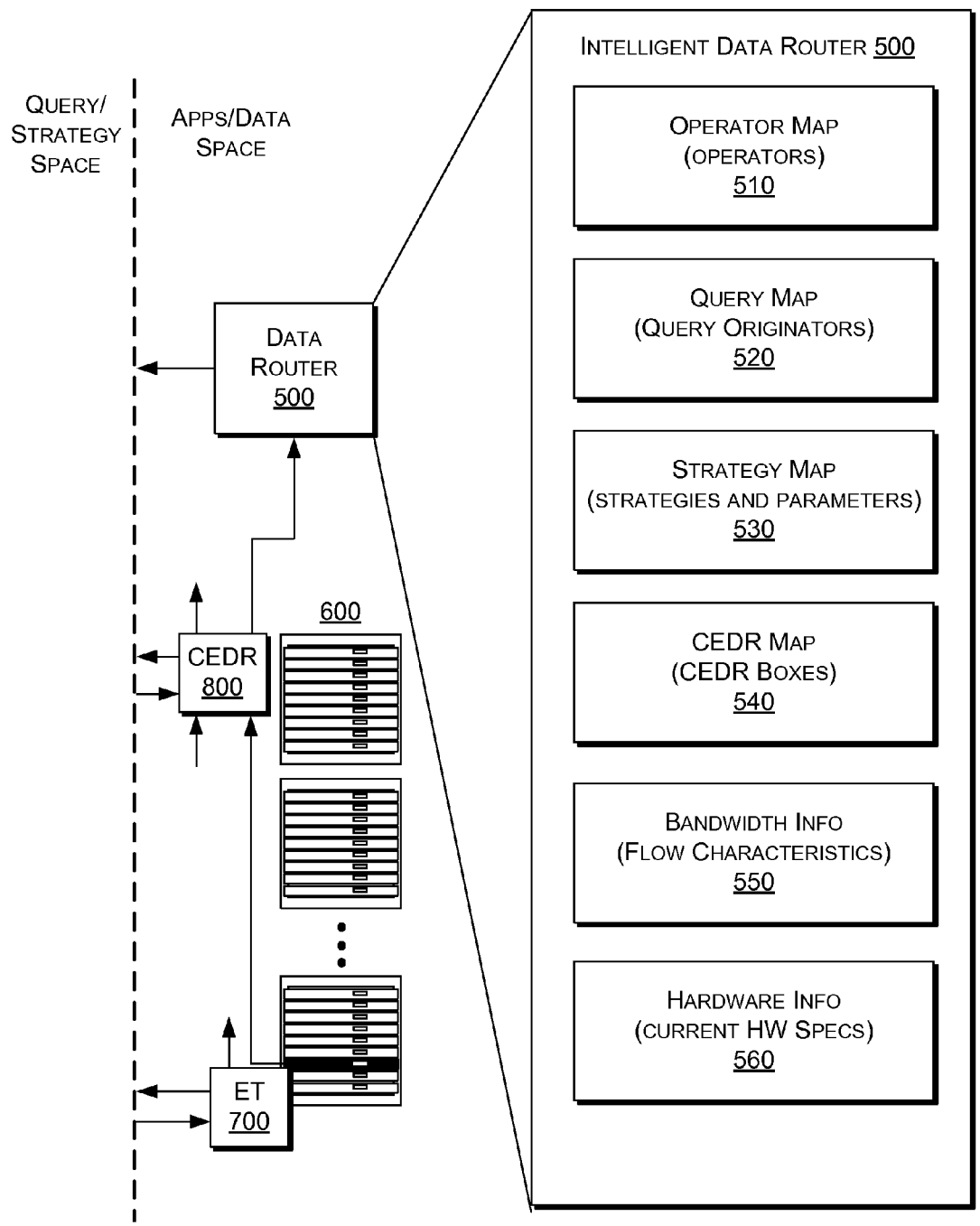
FIG. 7 is a diagram of an exemplary intelligent data router.

In the example of FIG. 7, a consumer 750 is an application that can read log files or listen to a session 724 for real time events. Event consumption is typically callback-based; a consumer 750 registers an event callback, which the ET module 720 calls with one event at a time. Events are typically delivered to the ET consumer 750 in chronological order. General-purpose event consumer tools can optionally dump events into any of a variety of formats. For example, an XML dump of a "Process" event logged by a kernel provider may be generated by an appropriate tool on the underlying OS. Such an event indicates the start of a "Notepad" process. Since events often contain custom user content logged by a provider 740, some type of metadata may be needed for decoding. A provider 740 using certain APIs may be expected to supply an event manifest—an XML file—that defines all events that providers write along with their layout information. A general-purpose consumer application 750 may use Trace Data Helper (TDH) APIs to retrieve the event metadata, decode the events, and display them.

For many, tracing means collecting events from certain providers of interest. In this way of thinking, an event trace session 724 is tied to one or more providers 740 in a conceptual collection as a whole, and a session itself (the logging engine) is often overlooked. The ET architecture 700 allows for more dynamic and flexible trace and event management. Here, sessions 724 and providers 740 exist in different spaces. A controller 730 is the one that starts and stops ET sessions 724 and enables providers 740 to sessions dynamically. Thus, a controller 730 can choose to enable a group of providers to a session, disable some of them after a while, and enable another provider to that same session later. Sessions 724 operate in a kernel and are not statically tied to providers 740. Likewise, providers 740 typically are not aware of which sessions 724 their events are being logged to. There are large scale applications and services that are providers 740, controllers 730, and consumers 750 all at the same time.

In the architecture 700, APIs may be provided for all operations for controllers 730, providers 740, and consumers 750, and applications may assume any combination of roles. In conventional event tracing, however, developers implement only event providers 740 and use in-the-box tools to collect traces and view them.

Separation of providers 740 and trace sessions 724 allows tracing to become immune to application problems such as crashes or hangs. Events logged by providers 740 before a crash normally reside in kernel memory, if not in a trace file 760 already, which makes this particularly useful in debugging application anomalies.

The event tracing architecture can be used by developers, IT administrators, and management tool developers for debugging, monitoring, diagnosis, and capacity planning. The usual analysis methodologies based on events can be categorized into the following techniques: Scanning (e.g., through an event dump); Delta Analysis (e.g., via timestamp and CPU usage numbers for each event); Property (Event B)-Property (Event A) (e.g., to allow for response time and CPU usage statistics of application activities); Statistical Analysis (e.g., counting certain events for insight into software behavior); State Machine and Resource Tracking (construction of a state machine and in turn, a simulation based on traces); and End-to-End Tracing (e.g., an application that includes a number of distributed components integrated via complicated interconnections).

With respect to the latter, in general, conventional event tracing requires instrumentation points to be added throughout application components to record activities along with a unique ID for a request currently being served. After traces are collected, events that correspond to the same request are correlated during event consumption such that its activity and progress can be tracked. Later, specific requests of interest can be looked at individually for problems in different service stages, or a group of requests can be summarized through a statistical analysis.

As described herein, various exemplary techniques include instructing one or more controllers associated with event tracing to acquire information germane to operation of a computing device and/or an application executing on a computing device. For example, in the query system 400, the query module 410 can issue one or more queries that instruct a controller to acquire event tracing information.

Figure 4:
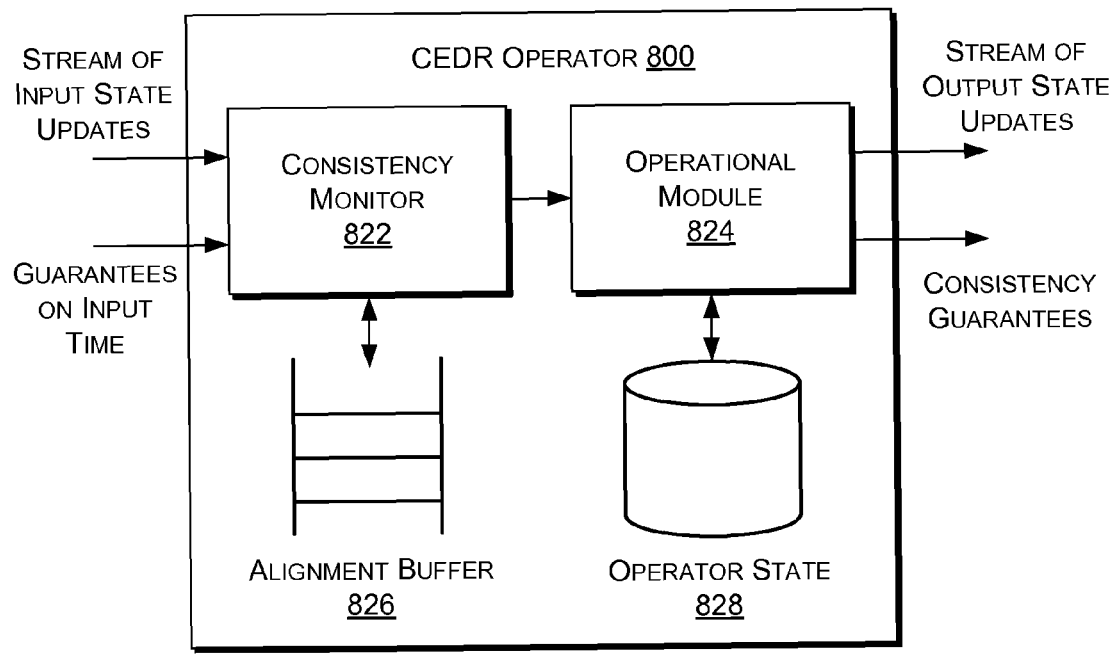
FIG. 4 is a diagram of an exemplary event detection and response module.

FIG. 4 shows an exemplary CEDR operator or module 800. The CEDR operator 800 includes a consistency monitor 822, an operational module 824, an alignment buffer 826 and an operator state tracker 828. The CEDR operator 800 receives a stream of input state updates and guarantees on input time and sends a stream of output state updates and consistency guarantees. The CEDR operator 800 refines application time into two temporal dimensions, valid time and occurrence time while another temporal dimension is referred to as CEDR time. Hence, the CEDR operator 800 has three temporal dimensions for a stream model.

In the CEDR operator 800, a data stream is modeled as a time varying relation. Each tuple in a relation is an event, and has an ID. Each tuple has a validity interval, which indicates the range of time when the tuple is valid from an event provider perspective. Given an interval representation of each event, it is possible to issue the following continuous query: "at each time instance t, return all tuples that are still valid at t." Thus, the CEDR operator 800 can naturally express such a query.

Referring to the query system 400 of FIG. 2, the query statement 220 may be written in an intuitive manner that can directly form a query for a CEDR module or can be parsed by the query module 410 to form an appropriate custom query for a CEDR module.

After an event initially appears in a stream, its validity interval (e.g. the time during which a coupon could be used) can be changed by the event provider. Such changes can be represented by tuples with the same ID but different content. A second temporal dimension, occurrence time, models when such changes occur from the event provider perspective. An insert event of a certain ID is the tuple with minimum occurrence start time value (Os) among all events with that ID. Other events of the same ID are referred to as modification events. Both valid time and occurrence time are assigned by the same logical clock of the event provider, and are thus comparable. The symbol "$t_v$" can be used to denote valid time and the symbol "$t_o$" to denote occurrence time.

The following schema can provide a conceptual representation of a stream produced by an event provider: (ID, Vs, Ve, Os, Oe, Payload) where Vs and Ve respectively denote valid start and end time; Os and Oe respectively denote occurrence start and end time; Payload is the subschema consisting of normal value attributes, and is application dependent.

A CEDR language for registering event queries can be based on the following three aspects:

1) event pattern expression, composed by a set of high level operators that specify how individual events are filtered, and how multiple events are correlated (joined) via time-based and value-based constraints to form composite event instances, or instances for short;

2) instance selection and consumption, expressed by a policy referred to as a "selection and consumption" (SC) mode; and 3) finally, instance transformation, which takes the events participating in a detected pattern as input, and transforms them to produce complex output events via mechanisms such as aggregation, attribute projection, and computation of a new function.

CEDR Language Example:
WHEN UNLESS(SEQUENCE(INSTALL x, SHUTDOWN AS y, 12 hours), RESTART AS z, 5 minutes)
WHERE {x.Machine_Id=y.Machine_Id} AND {x.Machine_Id=z.Machine_Id}

The SEQUENCE construct specifies a sequence of events that must occur in a particular order. The parameters of the SEQUENCE operator (or any operator that produces composite events in general) are the occurrences of events of interest, referred to as contributors. There is a scope associated with the sequence operator, which puts an upper bound on the temporal distance between the occurrence of the last contributor in the sequence and that of the first contributor. In this query, the SEQUENCE construct specifies a sequence that consists of the occurrence of an INSTALL event followed by a SHUTDOWN event, within 12 hours of the occurrence of the former. The output of the SEQUENCE construct should then be followed by the nonoccurrence of a RESTART event within 5 minutes. Nonoccurrences of events, also referred to as negation in this work, can be expressed either directly using the NOT operator, or indirectly using the UNLESS operator, which is used in this query formulation. Intuitively, UNLESS(A, B,w) produces an output when the occurrence of an A event is followed by non-occurrence of any B event in the following w time units; w is therefore the negation scope. In this query, UNLESS is used to express that the sequence of INSTALL, SHUTDOWN events should not be followed by no RESTART event in the next 5 minutes. One can also bind a sub-expression to a variable via AS construct, such that one can refer to the corresponding contributor in WHERE clause when we specify value constraints.

For the WHERE clause for this query, variables defined previously are used to form predicates that compare attributes of different events. To distinguish from simple predicates that compare to a constant like those in the first example, such predicates are referred to as parameterized predicates as the attribute of the later event addressed in the predicate is compared to a value that an earlier event provides. The parameterized predicates in this query compare the ID attributes of all three events in the WHEN clause for equality. Equality comparisons on a common attribute across multiple contributors are typical in monitoring applications. For ease of exposition, the common attribute used for this purpose is referred to as a correlation key, and the set of equality comparisons on this attribute as an equivalence test. The CEDR language offers a shorthand notation: an equivalence test on an attribute (e.g., Machine_Id) can be expressed by enclosing the attribute name as an argument to the function CorrelationKey with a keywords, such as EQUAL, UNIQUE (e.g., CorrelationKey(Machine_ID, Equal), as shown in the comment on the WHERE clause in this example). Moreover, if an equivalence test requires all events to have a specific value for the attribute id [Machine X], it can be expressed as [Machine_Id Equal 'Machine X'].

Referring again to FIG. 4, the CEDR operator 800 provides a set of composable operators that can be combined to form a pipelined query execution plan. Each CEDR operator 800 in an applications and data space can include the consistency monitor 822 and the operational module 824. The consistency monitor 822 decides whether to block the input stream in an alignment buffer 826 until output may be produced which upholds the desired level of consistency. The operational module 824 can compute the output stream based on incoming tuples and current operator state 828.

The CEDR operator 800 can accept occurrence time guarantees on subsequent inputs (e.g. provider declared sync points on input streams). These guarantees can be used to uphold the highest level of consistency, and allow for reducing operator state in all levels of consistency. The CEDR operator 800 can also annotate the output with a corresponding set of future output guarantees. These guarantees can be fed to a subsequent operator and streamed to a user with a corresponding query result.

A property of an exemplary CEDR operator 800 is that formal descriptions of operator semantics are used to prove that at common sync points, operators output the same bitemporal state regardless of consistency level. As a result, one can seamlessly switch from one consistency level to another at these points, producing the same subsequent stream as if a CEDR operator had been running at that consistency level all along.

Figure 5:
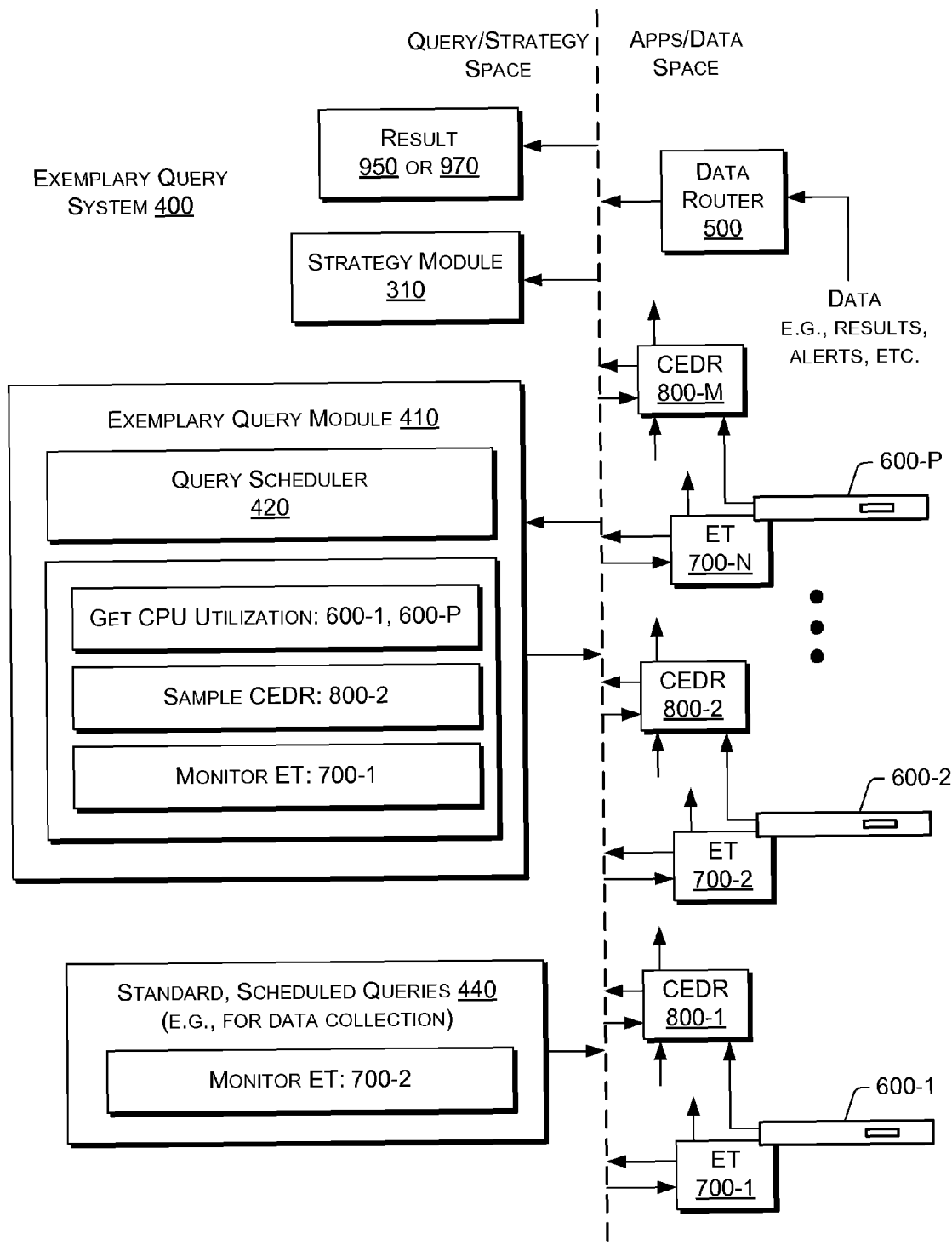
FIG. 5 is a diagram of the exemplary query system 400 of FIG. 2 for a specific scenario.

FIG. 5 shows the exemplary query system 400 in association with a particular exemplary scenario. Various components are shown in an applications and data space while the exemplary query module 410 exists in a query/strategy space. In this scenario, the query module 410 formulates and schedules queries: Get CPU Utilization for Servers 600-1 and 600-P; Sample CEDR Module 800-2; and Monitor ET Module 700-1. In addition, a standard scheduled query exists: Monitor ET Module 700-2.

The standard scheduled query represents a baseline level of query information from which the query module 410 injects additional queries to provide an answer to a request from, for example, an operator. In general, a query module can act to issue queries for: research driven data collection (e.g., with optimization/adaption); incident management; and to provide information above a baseline where appropriate (e.g., in response to perceived issues, trends, operator questions, etc.).

In the system 400, the queries are directed to the applications and data space components and information returned to the query/strategy space as a result 950 or 970 for an operator and/or to a strategy module 310.

Figure 6:
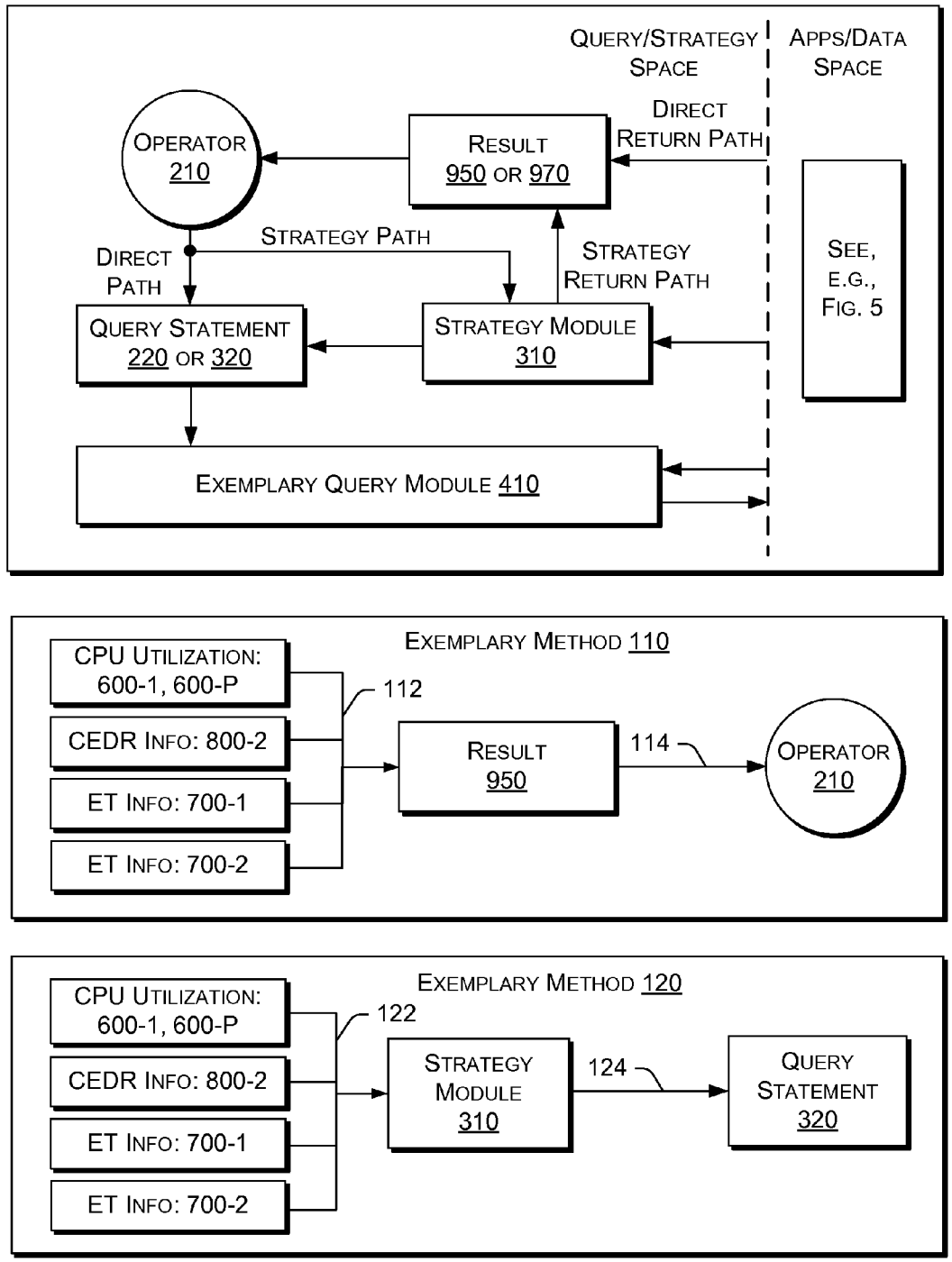
FIG. 6 is a diagram of exemplary methods for issuing queries to acquire information about an applications and data space.

FIG. 6 shows various components of the exemplary system 100 of FIG. 1 along with an exemplary method 110 and an exemplary method 120 that correspond to the queries of FIG. 5. The exemplary method 110 includes an information acquisition step 112 that acquires information responsive to the queries and a providing step 114 that provides a result 950, based on the acquired information, to the operator 210. The exemplary method 120 includes an information acquisition step 122 that acquires information responsive to the queries and a reformulation step 124 that uses a strategy module 310 to formulate additional queries based on the acquired information in the form of one or more query statements 320.

FIG. 7 shows an exemplary intelligent data router 500 that routes data from an applications and data space to a query/strategy space. The router 500 can include various components. For example, FIG. 7 shows an operator map 510, a query map 520, a strategy map 530, a CEDR map 540, a bandwidth information component 550 and a hardware information component 560. These components can operate in conjunction with queries, particularly queries directed to one or more CEDR modules 800. The data router 500 can ensure that information responsive to a particular query or queries is appropriately routed to the query/strategy space.

The exemplary data router 500 may use the query map 520 to direct information responsive to queries based on a query originator, which may be a particular operator. The exemplary data router 500 may use the CEDR map to aggregate or direct information generated in response to a common query statement from an operator (e.g., the statement 220 from the operator 210 of FIG. 2).

Figure 8:
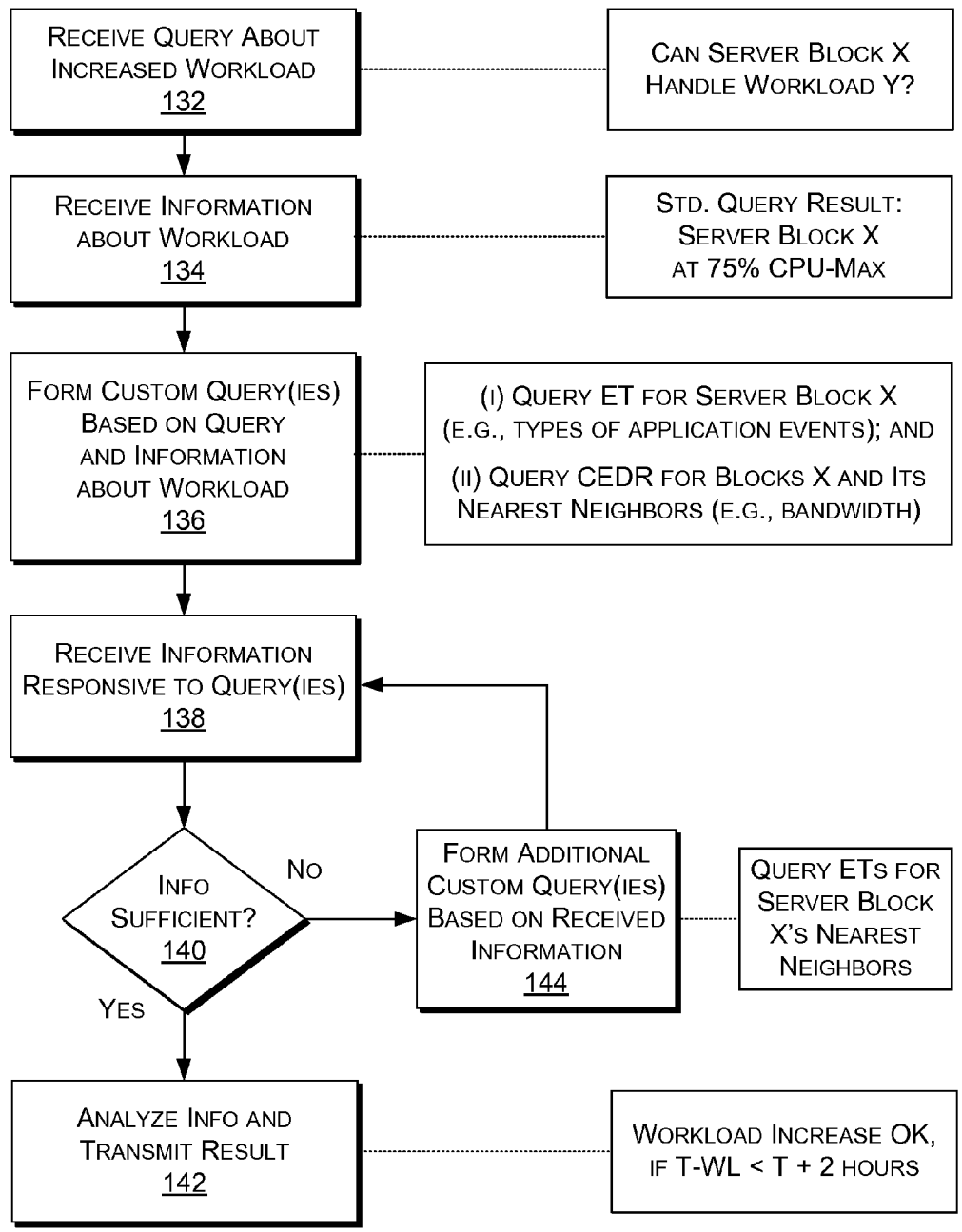
FIG. 8 is a diagram of an exemplary method for a workload query.

FIG. 8 shows an exemplary method 130 for a workload related query. The method 130 commences in a receipt block 132 that receives a query about increased workload. For example, an operator may ask: "Can server block X handle workload Y?" Another receipt block 134 receives information about workload, which may be general information responsive to one or more standard, scheduled queries. For example, a standard, scheduled query may provide information as to CPU utilization at server block X: "Server Block X at 75% of CPU-Max". Such information may be used to decide whether a custom query and/or an unscheduled standard query should be issued responsive to the query received at block 132.

In the instance that information is not sufficient to answer the query received at block 132, a formation block 136 forms one or more custom queries based on the received query and optionally on the received information about workload. For example, a custom query may (i) Query ET for Server Block X (e.g., types of application events); and (ii) Query CEDR for Blocks X and Its Nearest Neighbors (e.g., bandwidth). Once issued, a receipt block 138 receives information responsive to the custom queries.

Next, a decision block 140 decides whether the information responsive to the custom queries is sufficient to answer the query received at receipt block 132. If the decision block 140 decides that the information is sufficient, then an analysis and transmit block 142 transmits a sufficient result to the query originator. For example, the result may state: "Workload Increase OK, if T-WL<T+2 hours". In this example, an operator may add to the workload, as long as the time the workload is added occurs within two hours.

If the decision block 140 decides that the information is insufficient to provide an answer, then a formulation block 144 forms one or more additional queries based in part on the received information. For example, an additional query may be: "Query ETs for Server Block X's Nearest Neighbors".

In general, the method 130 aims to understand resource utilization with respect to workload. Often an operator will want to know something about the relationship between workload and performance through a server and want to know if workload is increased, will performance suffer, knowing that at some point performance will be unacceptable. Such a query may acquire information as to workload (e.g., disk i/o, memory, processors, threads in process, what concurrent activities going on, etc.). An exemplary query module may issue one or more custom queries to acquire sufficient information to answer a workload related question.

Figure 9:
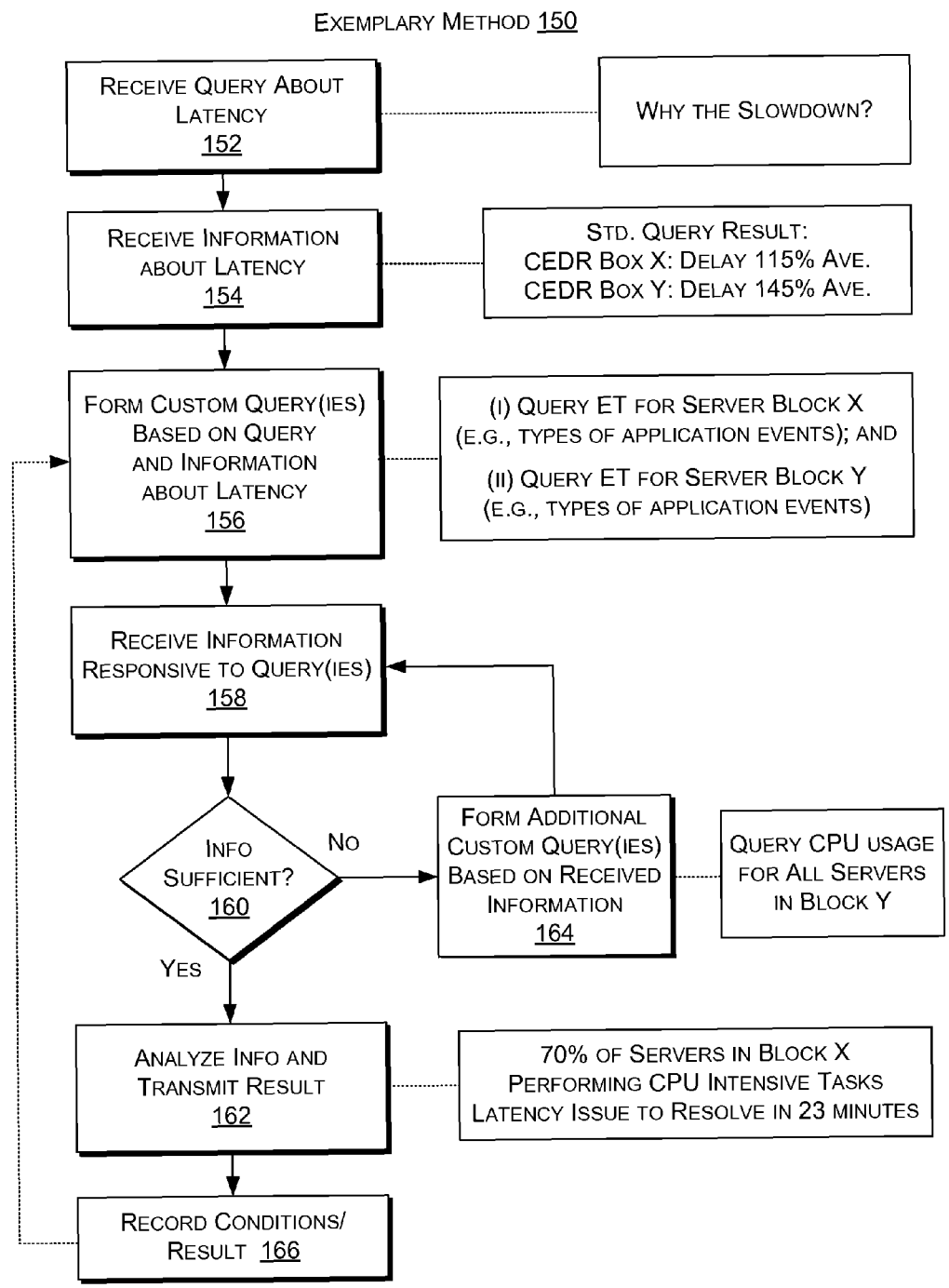
FIG. 9 is a diagram of an exemplary method for a latency query.

FIG. 9 shows an exemplary method 150 for a latency related query. The method 150 commences in a receipt block 152 that receives a query about latency. For example, an operator may ask: "Why the slowdown?" Another receipt block 154 receives information about latency, which may be general information responsive to one or more standard, scheduled queries. For example, a standard, scheduled query may provide information as to delays: "CEDR Box X: Delay 115% Ave.; CEDR Box Y: Delay 145% Ave." Such information may be used to decide whether a custom query and/or an unscheduled standard query should be issued responsive to the query received at block 152.

In the instance that information is not sufficient to answer the query received at block 152, a formation block 156 forms one or more custom queries based on the received query and optionally on the received information about latency. For example, a custom query may (i) Query ET for Server Block X (e.g., types of application events); and (ii) Query ET for Server Block Y (e.g., types of application events). Once issued, a receipt block 158 receives information responsive to the custom queries.

Next, a decision block 160 decides whether the information responsive to the custom queries is sufficient to answer the query received at receipt block 152. If the decision block 160 decides that the information is sufficient, then an analysis and transmit block 162 transmits a sufficient result to the query originator. For example, the result may state: "70% of Servers in Block X Performing CPU Intensive Tasks, Latency Issue to Resolve in 23 minutes". In this example, an operator may simply wait. A recordation block 166 can record the result and corresponding conditions, for example, to form a knowledge base for use in formulating custom queries.

If the decision block 160 decides that the information is insufficient to provide an answer, then a formulation block 164 forms one or more additional queries based in part on the received information. For example, an additional query may be: "Query CPU usage for All Servers in Block Y".

In general, latency issues arise with many types of applications (e.g., SaaS). A query may ask how long it takes to service queries, a search request or a hotmail inbox or how long for round trip. Conventional monitoring usually considers average time at the front end of a system only and does not address applications and data space back end. Sampling of front end machines alone may not provide an answer as to why some requests take longer than others. An exemplary system can help an operator determine why response is slow, determine who a front end machine "talks" to in a back end, and/or determine machine performance and, in response, drill down to those machines reporting slowness. In an adaptive, feedback driven manner, an exemplary system can flow queries across a system (e.g., to determine if certain machine tiers are problematic). An exemplary system can uncover issues related to a machine at one tier calling a machine at another tier an unreasonable number of times. An exemplary system can adapt a query more (e.g., these 50 machines have an issue) to ask what some machines have in common (e.g., version of software, applications, services, commonalities, differentials). An exemplary system can determine how much data is required to sufficiently answer a question (i.e., how much data is needed at a level to satisfy a query). For example, an exemplary system may decide that at local cluster, a certain version of software is running and then aggregate corresponding information at a lower level.

Information may be collected for use in answering subsequent queries. For example, a reservoir of historical information may be maintained for levels of a stack. An application developer can be aware of such a reservoir and chose to collect information that is consistent across reservoirs. In instances where an application developer does not chose to do this, then an exemplary system can create a layer of software that intercepts the flow and populates the reservoir. In either instance, over time, a reservoir becomes populated with information that can be germane to anticipated queries or even unanticipated queries. An exemplary system includes one or more CEDR operators that function as reservoirs for information. An exemplary system can direct a CEDR operator to create or optimize a reservoir on the fly. For example, an instruction may ask that SQL queries from hotmail be sampled and every $1/10,000$th query maintained in a CEDR operator reservoir.

Figure 10:
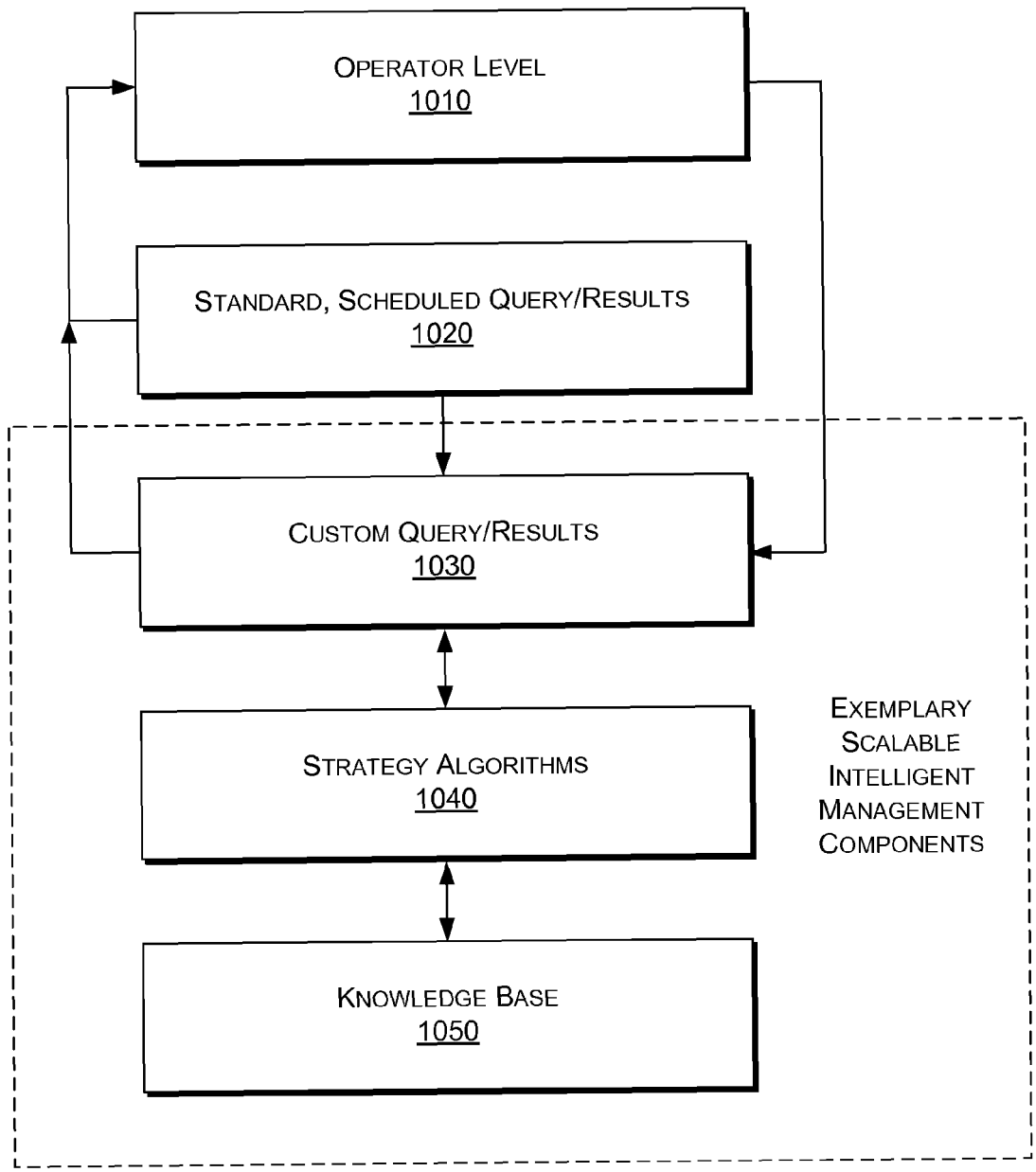
FIG. 10 is a diagram of an exemplary architecture that includes scalable intelligent management components.

FIG. 10 shows an exemplary architecture 1000 that includes exemplary scalable intelligent management components. The architecture 1000 includes an operator level 1010, a standard, scheduled query/results component 1020, a custom query/results component 1030, strategy algorithms 1040 and a knowledge base 1050. The knowledge base 1050 may be maintained in a query/strategy space or in an applications/data space. A knowledge base 1050 may be maintained in a distributed manner, for example, across a plurality of reservoirs. The components 1030, 1040 and 1050 are scalable to accommodate increases or changes to an applications and data space. Further, such components may bridge multiple server farms that may be operating in different geographical locations.

Figure 11:
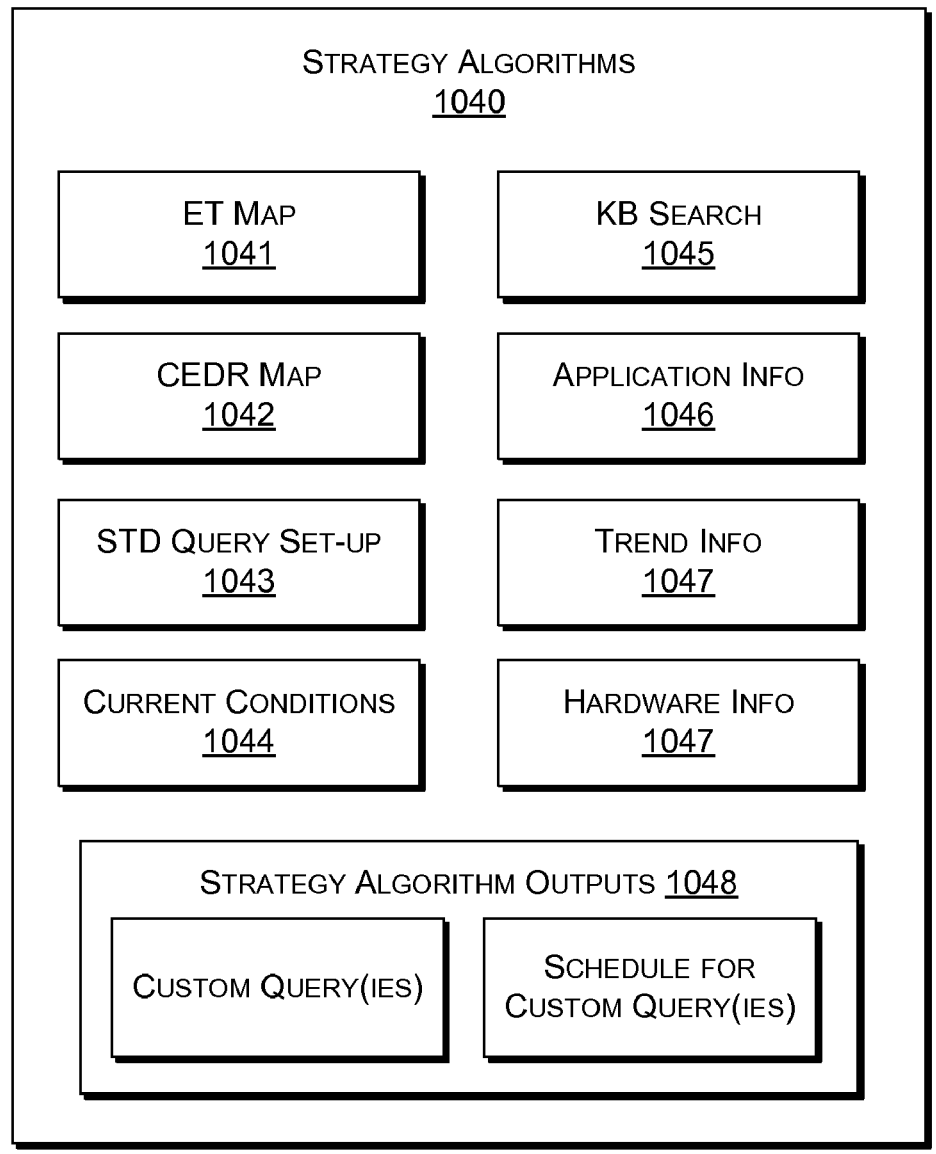
FIG. 11 is a diagram of various strategy algorithms.

FIG. 11 shows various exemplary strategy algorithms component 1040. The component 1040 includes information such as an ET map 1041, a CEDR map 1042, information about a standard query set-up 1043, current condition information 1044, a knowledge base search module 1045, application information 1046 (e.g., about distributed applications), trend information 1047 and hardware information 1047. A strategy algorithm can provide outputs as indicated by the outputs block 1048, which includes custom queries and scheduling for custom queries. Again, as described herein, temporal information can be used in scheduling queries as particular components act or receive information in a manner related to performance of an application and/or equipment. Such temporal scheduling can assist in answering questions and, in general, understanding operations taking place in an applications and data space.

Figure 12:
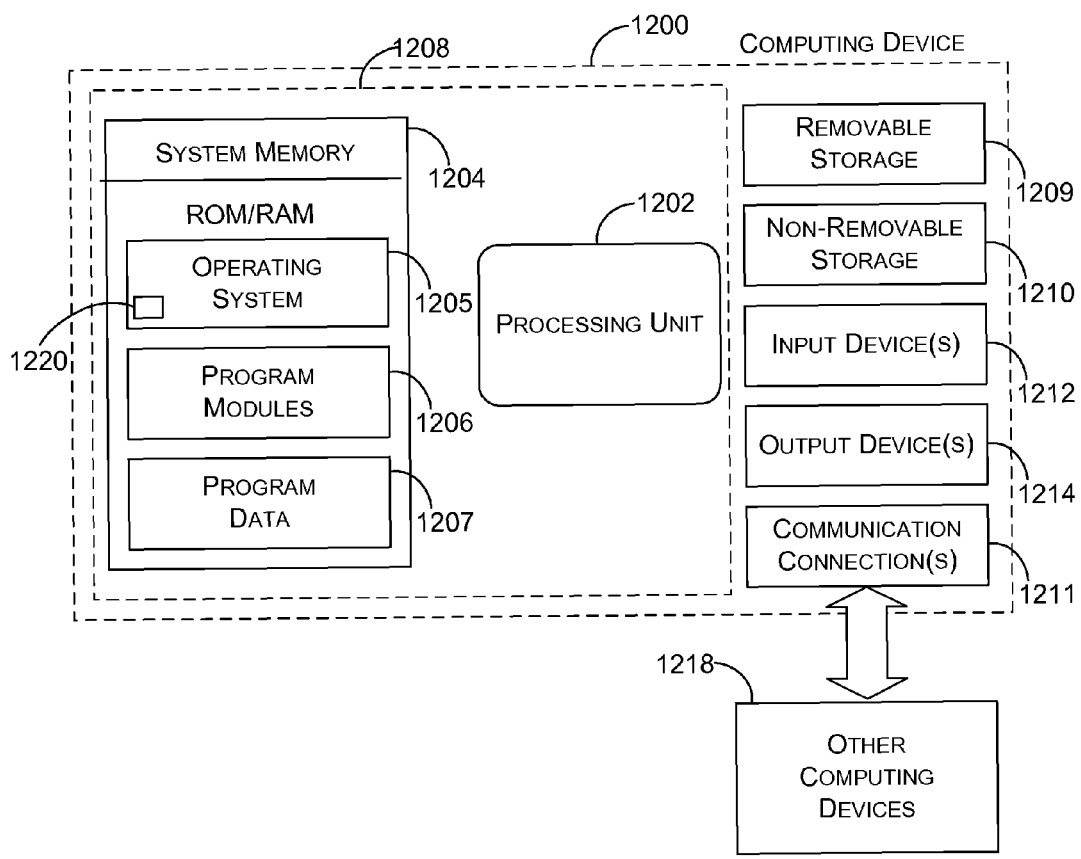
FIG. 12 is a block diagram of an exemplary computing device.

FIG. 12 illustrates an exemplary computing device 1200 that may be used to implement various exemplary components and in forming an exemplary system. For example, the servers and clients of the system of FIG. 1 may include various features of the device 1200.

In a very basic configuration, computing device 1200 typically includes at least one processing unit 1202 and system memory 1204. Depending on the exact configuration and type of computing device, system memory 1204 may be volatile (such as RAM), non-volatile (such as ROM, flash memory, etc.) or some combination of the two. System memory 1204 typically includes an operating system 1205, one or more program modules 1206, and may include program data 1207. The operating system 1205 include a component-based framework 1220 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 1200 is of a very basic configuration demarcated by a dashed line 1208. Again, a terminal may have fewer components but will interact with a computing device that may have such a basic configuration.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by removable storage 1209 and non-removable storage 1210. Computer storage media may include volatile and nonvolatile, removable and non-removable media implemented in any method or technology for storage of information, such as computer readable instructions, data structures, program modules, or other data. System memory 1204, removable storage 1209 and non-removable storage 1210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of device 1200. Computing device 1200 may also have input device(s) 1212 such as keyboard, mouse, pen, voice input device, touch input device, etc. Output device(s) 1214 such as a display, speakers, printer, etc. may also be included. These devices are well know in the art and need not be discussed at length here.

Computing device 1200 may also contain communication connections 1216 that allow the device to communicate with other computing devices 1218, such as over a network. Communication connections 1216 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented at least in part by a computing device, the method comprising:
   receiving a query statement about latency;
   receiving information about latency in an applications and data space that comprises a plurality of servers;
   formulating one or more custom queries that differs in scope from a standard scheduled query based in part on the query statement and the information about latency after determining that the query statement does not correlate to a standard scheduled query;
   receiving information responsive to at least the one or more custom queries;
   determining whether the information responsive to at least the one or more custom queries comprises information sufficient to respond to the query statement about increased latency; and
   formulating one or more additional custom queries based on the determination.

2. The method of claim 1 wherein the information responsive to a query comprises information issued by one or more event tracing modules and/or one or more event detection and response modules.

3. The method of claim 1 wherein information sufficient to respond to the query statement about increased latency comprises a time associated with an expected decrease in latency in the applications and data space.

* * * * *